United States Patent [19]

Yoshida et al.

[11] Patent Number: 4,597,028
[45] Date of Patent: Jun. 24, 1986

[54] ELECTRIC DOUBLE LAYER CAPACITOR AND METHOD FOR PRODUCING THE SAME

[75] Inventors: Akihiko Yoshida, Osaka; Atsushi Nishino; Ichiro Tanahashi, both of Neyagawa; Yasuhiro Takeuchi, Hirakata, all of Japan

[73] Assignee: Matsushita Electric Industrial Co., Ltd., Osaka, Japan

[21] Appl. No.: 638,656

[22] Filed: Aug. 7, 1984

[30] Foreign Application Priority Data

| Aug. 8, 1983 | [JP] | Japan | 58-143652 |
| Aug. 20, 1983 | [JP] | Japan | 58-150929 |
| Aug. 30, 1983 | [JP] | Japan | 58-157172 |
| Sep. 20, 1983 | [JP] | Japan | 58-172123 |

[51] Int. Cl.$^4$ .................. H01G 1/01; H01G 9/00; H01G 7/00
[52] U.S. Cl. ............... 361/305; 29/25.42; 252/62.2; 361/433
[58] Field of Search ........... 252/62.2; 361/303, 304, 361/305, 324, 433; 29/25.42

[56] References Cited

U.S. PATENT DOCUMENTS

| 3,185,907 | 5/1965 | McKee et al. | 361/305 |
| 3,239,731 | 3/1966 | Matovich | 361/305 X |
| 3,700,975 | 10/1972 | Butherus et al. | 361/433 |
| 4,285,831 | 8/1981 | Yoshida et al. | 252/423 |
| 4,363,079 | 12/1982 | Sekido et al. | 252/62.2 X |

FOREIGN PATENT DOCUMENTS

| 38-12376 | 4/1963 | Japan |
| 48-59363 | 8/1973 | Japan |
| 55-99714 | 7/1980 | Japan |
| 56-114312 | 9/1981 | Japan |
| 57-17136 | 1/1982 | Japan |
| 57-12515 | 1/1982 | Japan |
| 57-10205 | 2/1982 | Japan |

Primary Examiner—Donald A. Griffin
Attorney, Agent, or Firm—Spencer & Frank

[57] ABSTRACT

An electric double layer capacitor having polarizable electrodes including activated carbon fibers which are fully activated and have a large specific surface area, and a method for making the same. Each of the polarizable electrodes is composed of an activated carbon element having a surface fiber ratio (total geometric surface area of fabric/total geometric surface area of secondary fibers or strands) of 0.01 or more. Each activated carbon element is in the form of a woven fabric, nonwoven fabric, felt or the like including activated carbon fibers.

15 Claims, 47 Drawing Figures

100-WEIGHT LOSS(%) OR 100-AREA LOSS(%)

ELECTRIC DOUBLE LAYER CAPACITOR AND METHOD FOR PRODUCING THE SAME

BACKGROUND OF THE INVENTION

The present invention relates to an electric double layer capacitor using polarizable electrodes made of activated carbon fibers and a method for producing the same.

As shown in FIG. 1 of the accompanying drawings, the electric double layer capacitor basically includes a pair of polarizable electrode units formed by activated carbon layers 1 and 2 and collector electrodes 3 and 4, and a separator 5 interposed between the polarizable electrodes. The activated carbon layers 1 and 2 and the separator 5 are impregnated with an electrolyte.

The electric double layer capacitors of this basic construction are roughly divided into the following three types of specific constructions. As shown in FIG. 2, the first type is constructed by applying a mixture 6 of activated charcoal powder and an organic binder such as fluorine resin powder onto aluminum nets 7, coiling the aluminum nets 7 together with separators 8, placing these components in a metal can 9 and hermetically sealing the can 9 with a rubber sealing cap 10. The coiled assembly is impregnated with an electrolyte composed of an aqueous solution of sulfuric acid or the like, or an organic mixture of tetraethyl ammonium perchlorate and propylene carbonate or the like as mentioned previously, and numerals 11 and 12 designate electrode leads. The second type, shown in FIG. 3, uses viscous paste 13 and 14 prepared by mixing an aqueous electrolyte and activated charcoal powder and it includes an interposed separator 15, insulating rings 16 and 17 and conductive elastic electrodes 18 and 19. With the first and second types using activated charcoal powder as the polarizable electrodes, the former features high breakdown voltage and the latter features reduced internal resistance. In addition to these types, a third type (Japanese Laid-Open Patent Application No. 55-99714) which we have invented employs activated carbon fibers as polarizable electrodes.

In FIG. 4 showing the third type capacitor, activated carbon fiber fabrics 20 and 21 which are respectively formed with metal sprayed coatings 22 and 23 are arranged opposite each other through the intermediary of a separator 24 and are hermetically assembled with a gasket 25 and metal cases 26 and 27. Since this type can be formed into a flat coin shape, is easy to manufacture and is small in size and high in capacitance, the third type is suitable for miniature circuits for back-up use in microcomputers.

Then, with the capacitors of the type using an activated carbon fabric, if the fabric is produced by carbonization and activation processes, the manner of weaving the fibers into the fabric has an important effect on the characteristics of the capacitor having the thus formed fabric. More specifically, the higher the proportion of the fibers entering the inside of the fabric is, the harder will it be for the activation gas (e.g., water vapor, $CO_2$ or HC) to sufficiently penetrate into the surface of the fibers at the inside during the activation thus impeding the progress of the uniform activation for the fabric on the whole. Therefore, in order to satisfactorily promote the uniform activation of the fabric on the whole, it is impossible to obtain the desired specific surface area per unit weight unless the activation temperature is increased extremely or the activation time is increased. However, if the activation temperature is increased or the activation time is increased, the strength of the resulting activated carbon fabric is descreased considerably thereby rendering the activated fabric unsuited for use.

It is an object of the present invention to provide an electric double layer capacitor having polarizable electrodes constituted by activated carbon fibers which are activated fully and have a large specific surface area.

SUMMARY OF THE INVENTION

Thus, the electric double layer capacitor of this invention features that activated carbon elements having a surface fiber ratio (total geometric surface area of fabric/total geometric surface area of secondary fibers or strands) of 0.01 or more are used as polarizable electrodes. Here, the term "activated carbon elements" means one which is in the form of a woven fabric, non-woven fabric, felt or the like composed of activated carbon fibers.

Accordingly, it is another object of the present invention to provide a method for producing electric double layer capacitors having polarizable electrodes constituted by carbonizing and activating woven fabric, non-woven fabric, felt or the like which have a surface fiber ratio of 0.01 or more.

BRIEF DESCRIPTION OF THE DRAWINGS

The present invention will be apparent from the following detailed description taken in conjunction with the accompanying drawings, in which.

DESCRIPTION OF THE PREFERRED EMBODIMENT

The details of the present invention will now be described with reference to FIGS. 5 to 30.

The electric double layer capacitor of the invention is one (e.g., a capacitor of the form shown in FIG. 4) employing polarizable electrodes made of a woven fabric, nonwoven fabric, felt, or the like composed of at least activated carbon fibers as one of its constituent ingredients and more particularly one in which these polarizable electrodes are high in capacitance value per unit area and unit weight and low in internal resistance.

To accomplish these objects, the invention features the construction (the weaving method, specific weight, etc.), materials and carbonization and activation processes of the polarizable electrodes.

The feature of the activated carbon fiber polarizable electrodes of the invention will now be described in detail in terms of the individual raw materials and production methods.

(1) Surface fiber ratio and weaving type.

In the case of a capacitor having polarizable electrodes made of an activated carbon fabric such as the present invention, when a raw fabric is subjected to carbonization and activation processes, the type of weaving the fibers for forming the fabric governs the various properties of the resulting activated carbon fabric and hence the characteristics of a capacitor having the electrodes. More specifically, the higher the proportion of the fibers entering the inside of a fabric, the harder will it be for an activation gas (e.g., water vapor, $CO_2$ or HC) to satisfactorily enter and contact the surface of the fiber at the inside of the fabric during the activation process thereby making the uniform progress of the activation difficult on the whole. Thus, in order to ensure satisfactory progress of the uniform activation of the fabric on the whole, it is impossible to obtain the desired specific surface area per unit weight unless the activation temperature is increased extremely or the activation time is increased. However, if the activation temperature is increased or the activation time is increased, the strength of the resulting activated carbon fabric is descreased considerably and it is not suited for use.

Figure 5:
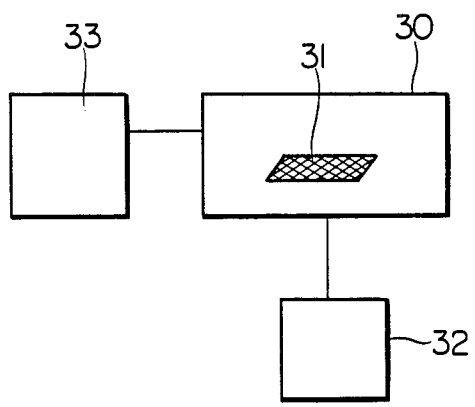
FIG. 5 is a schematic diagram showing an example of apparatus for subjecting raw fibers to carbonization and activation processes.

FIG. 5 shows an example of an apparatus for activating a raw fabric.

Figure 6A:
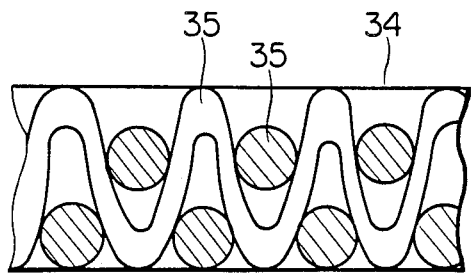
FIGS. 6a to 6d are sectional views useful for explaining the surface fiber ratio of woven fabrics.
Figure 6B:
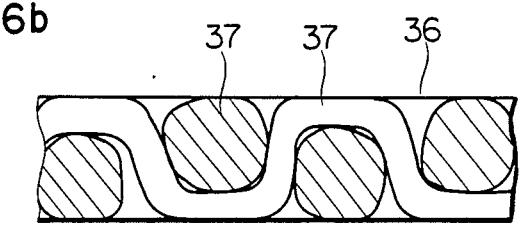

A raw fabric 31 accommodated within a furnace 30 is carbonized and activated by being contacted with an activation gas supplied from an activation gas supply unit 33 at a high temperature in the furnace 30 which is controlled by a control unit 32. For example, as regards the construction of raw fibers, where the proportion of fibers 35 positioned at the surface of a fabric 34 is small as compared with the amount of fibers entering the inside of the fabric in the thickness direction thereof as shown in FIG. 6a, during the activation processing, only the activation of the surface of the fabric progresses, while, the progress of the activation of the inside of the fabric is rendered difficult. As a result, even in the case of fabrics having the same fabric weight per unit fabric area (hereinafter referred to as eyelet or unit-area weight ($g/m^2$), if the proportion of fibers 37 exposed to the surface of a fabric 36 is small as shown in FIG. 6b, the activation of the fabric is made difficult.

Thus, the proportion of the fibers exposed to the surface of the fabric is defined as (total geometric surface area of fabric/total geometric surface area of secondary fibers or strands) and it is referred to as a surface fiber ratio.

Figure 6C:
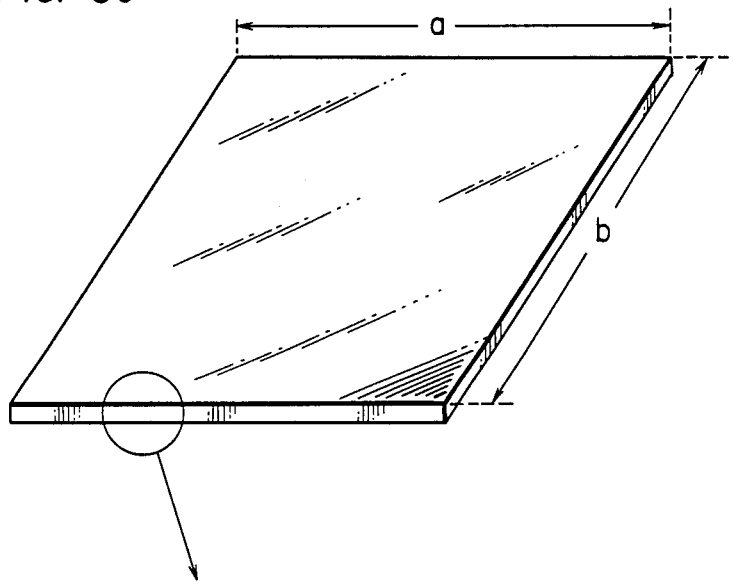
Figure 6D:
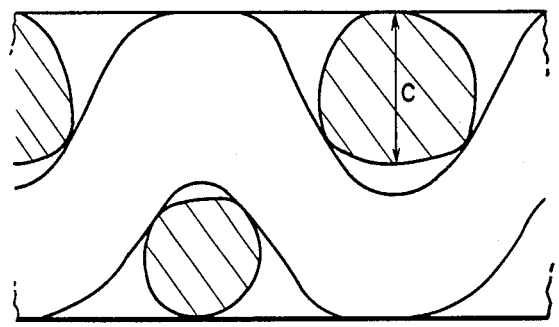

The surface fiber ratio is calculated by the following method on the basis of the dimensions shown in FIGS. 6c and 6d.

The total geometric surface area $S_1$ of the fabric or material is obtained from the expression $S_1 = a \times b$.

The total geometric surface area $S_2$ of secondary fibers or strands is obtained by the following method.

$$S_2 = \pi c \times l$$

where c: diameter of secondary fibers or strands; and l: total length of secondary fibers.

With $W g/m^2$ representing the weight ($g/m^2$) of the fabric and $w g/m$ representing the weight per unit length of the secondary fiber, the value of l is calculated from $l = W/w (m)$. In this way, the surface fiber ratio $o = S_1/S_2$ is obtained.

Figure 7:
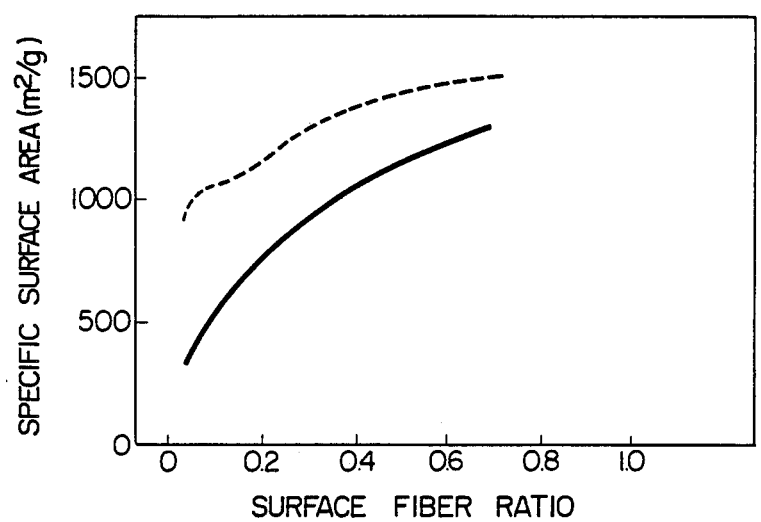
FIG. 7 is a graph showing the relation between the surface fiber ratio of fabrics and the specific surface area of activated carbon fibers.

FIG. 7 shows the relation between the surface fiber ratio (total geometric surface area of fabric/total geometric surface area of secondary fibers or strands) and the specific surface area of the fiber, after it has been activated, with respect to raw fiber fabrics (hereinafter referred to as raw fabrics) comprised of phenol type fiber fabrics having weight (g/m²) of 200 g/m². In the Figure the solid line shows the relation obtained with activation for 30 minutes at 800° C. and the broken line shows the relation with activation for 2 hours at 800° C.

Figure 8:
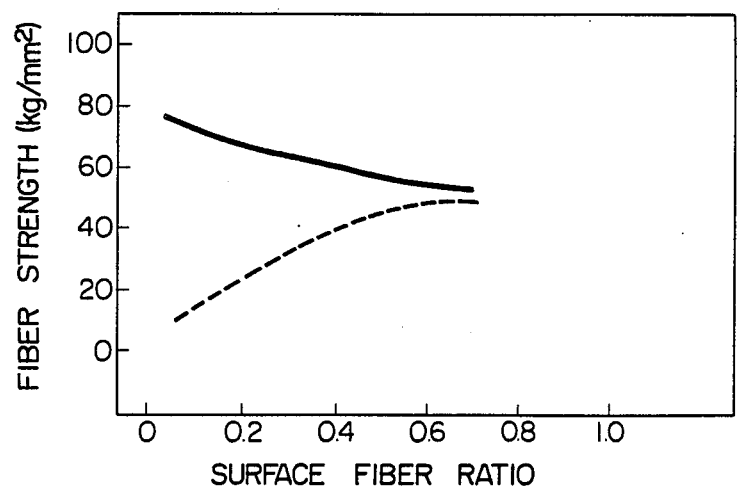
FIG. 8 is a graph showing the relation between the surface fiber ratio of fabrics and the strength of the resulting carbon fibers.

FIG. 8 shows the fiber strength of the activated fabrics (activated carbon fabrics) as a function of the surface fiber ratio of the fabrics.

As will be seen from these results, the activation proceeds more smoothly and uniformly and the fabric strength is also maintained high for the same unit-area weight in proportion to the value of the surface fiber ratio.

Figure 9:
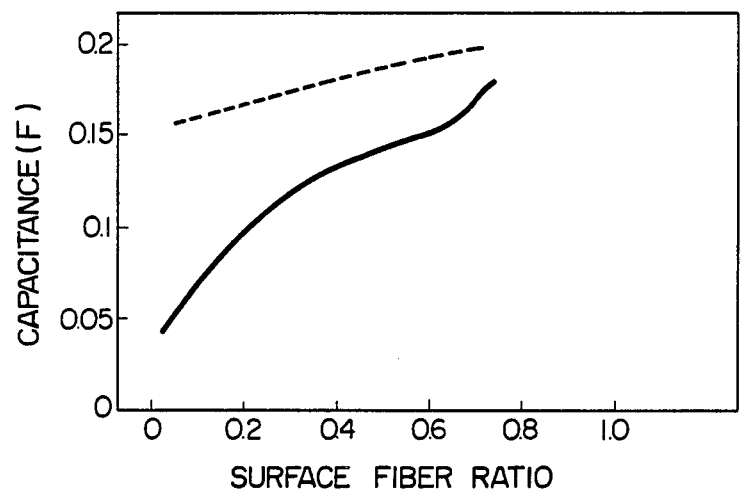
FIG. 9 is a graph showing the relation between the surface fiber ratio of fabrics and the capacitance of capacitors having electrodes of fabrics having the indicated ratios.

In FIG. 9 showing the characteristics of the electric double layer capacitors produced by using the above-mentioned activated carbon fabrics, the abscissa represents the surface fiber ratio and the ordinate represents the capacitance (farad). It shows that the output capacitance increases in proportion to the value of the surface fiber ratio. The values represent the single-cell capacitances with the electrodes of 5 mm φ.

In the case of an element made of activated carbon fibers having a large surface fiber ratio, the element is fully activated uniformly throughout the whole element (particularly in the thickness direction) and thus the capacitance of the activated carbon fibers in the thickness direction of the element is satisfactorily taken out with low resistance to the conductive electrode layer at the surface.

In view of the foregoing background, the present invention requires the use of an activated carbon fabric made by a weaving method which produces a surface fiber ratio of 0.01 or more.

Two methods are available for increasing the surface fiber ratio. The first method has recourse to the selection of a weaving method of the secondary fibers and the second method has recourse to the selection of the primary fibers forming the secondary fibers. While the diameter of the secondary fibers used in the invention is in the range from No. 1 size to No. 40 size, the primary fibers used have a small diameter and the primary fibers are bundled into the secondary fibers thereby increasing the effective fiber area per unit area of the fabric.

Figure 10A:
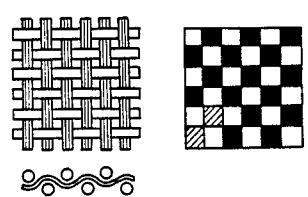
FIGS. 10a to 10a weaving methods of raw woven fabrics used with the embodiment of the invention.
Figure 10B:
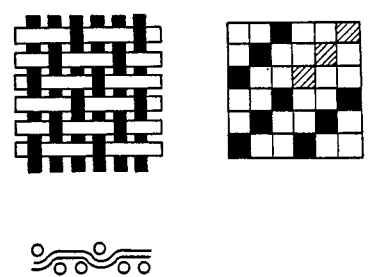
Figure 10C:
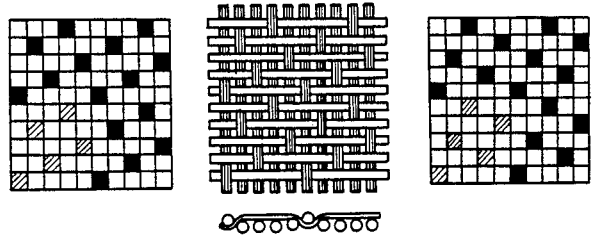
Figure 10D:
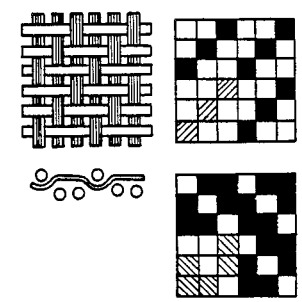

FIGS. 10a to 10d are schematic diagrams showing various weaving methods of raw fabrics with FIG. 10a showing a plain weave, FIG. 10b a twill weave, FIG. 10c a satin weave and FIG. 10d a basket weave, and these weaves represent the principal ones. With any of these weaving methods, it is possible to preset the surface fiber ratio to 0.01 or more by suitably controlling the thickness of the secondary fibers, the weaving density, etc., and also there is the effect of increasing the strength of the resulting fabrics and ensuring easy handling of the fabrics during manufacture.

Figure 11A:
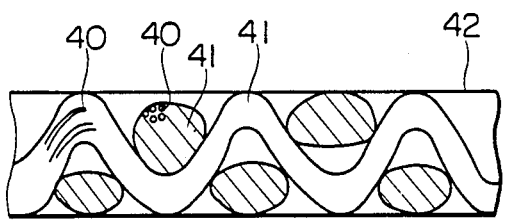
FIGS. 11a to 11c are sectional views showing the relation between the primary and secondary fibers of woven fabrics.
Figure 11B:
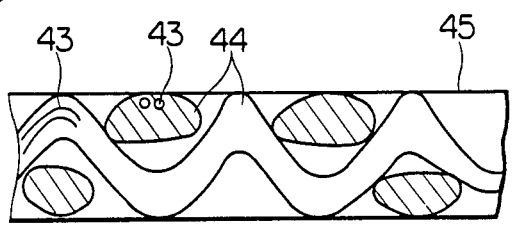
Figure 11C:
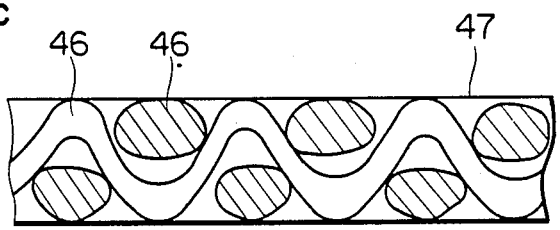

FIGS. 11a to 11c show the relation between the primary and secondary fibers and the fabrics with FIG. 11a showing a plain fabric 42 woven by using secondary fibers 41 of 0.5 mm diameter made by bundling primary fibers 40 of 0.2 μm diameter and 100 mm long, FIG. 11b a plain fabric 45 woven by using secondary fibers 44 of 0.5 mm diameter made by bundling primary fibers 43 of 10 μm diameter and 100 mm long and FIG. 10c a plain fabric 47 woven by directly using continuous filaments 46 of 0.5 mm diameter as primary fibers. When these three types of fabrics are subjected to the activation process under the same conditions, the activation gas contacts and reacts with the outer surface of the fibers in a greater extent in the order of FIGS. 11c, 11b and 11a.

(2) Relation between weight (g/m²) of fabric and capacitance.

This section describes the correlation between the weight loss and shrinkage due to the activation of raw fabrics and the capacitance of electric double layer capacitors using the resulting activated carbon fabrics and also a description is made of the feature of the invention concerning the optimum range of unit-area weights for obtaining the desired capacitance of the capacitor on the basis of the results of the study of the correlation.

Figure 12:
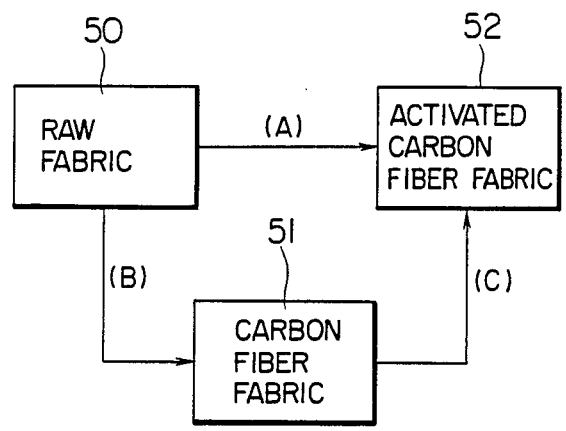
FIG. 12 is a diagram showing the carbonization and activation processes of raw fibers and the relation between the processes.

FIG. 12 is a flow sheet for the carbonization and activation of a raw fabric, in which numeral 50 designates a raw fabric, 51 a carbon fiber fabric, 52 an activated carbon fiber fabric, A a carbonization and activation process, B a carbonization process and C an activation process.

While a woven or nonwoven raw fabric placed in an activation gas at a high temperature is subjected to carbonization and activation according to the above-mentioned processes, the carbonization process B causes the gasification of the volatile compounds in the raw fabric 50 and the carbonization of the fabric. Activation process C forms small pores in the surface of the carbonized fiber fabric 51 by the reaction of the following formula (1) thereby increasing the specific surface area

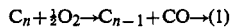

$$C_n + \tfrac{1}{2}O_2 \rightarrow C_{n-1} + CO \rightarrow (1)$$

The carbonization and activation process A causes the two processes B and C to proceed simultaneously and continuously. Each of these processes causes a loss of the weight and area of the raw fabric and serves as a measure of the degree of progress of the carbonization and activation reaction. The degree of progress of the carbonization and activation reaction has a significant effect on the characteristics of an electric double layer capacitor in which the fabric is used as its electrodes.

Figure 13:
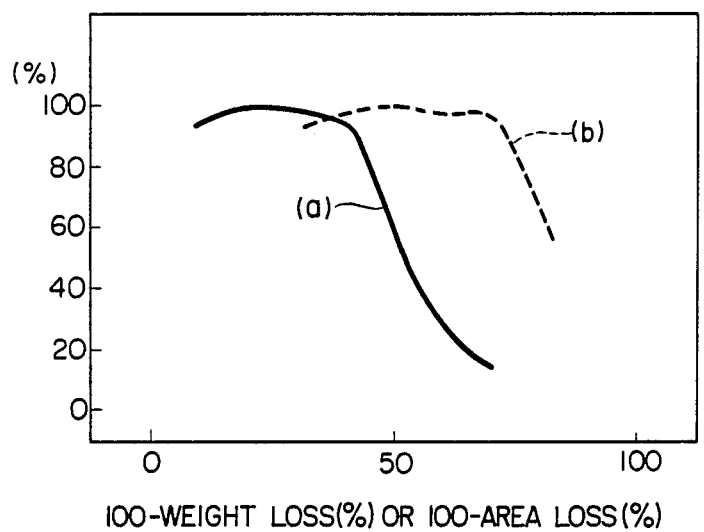
FIG. 13 is a graph showing the relation between the weight loss of raw fabric during the carbonization and activated processes and the capacitance ratio of the capacitors with the resulting activated carbon fibers.

FIG. 13 is a graph showing the relation between the weight loss or area loss caused by carbonization and activation of the fabrics and the capacitance ratio of the capacitor, which shows that the maximum capacitance value (per unit area fabric) is obtained when the weight loss of the raw fabric shown by the curve (a) is from 60% to 90% and the area loss of the raw fabric shown by the curve (b) is from 30% to 70%. Note that the ordinate represents the capacitance ratio (%) with the capacitance value corresponding to the maximum capacitance output per unit area taken as 100.

Figure 14:
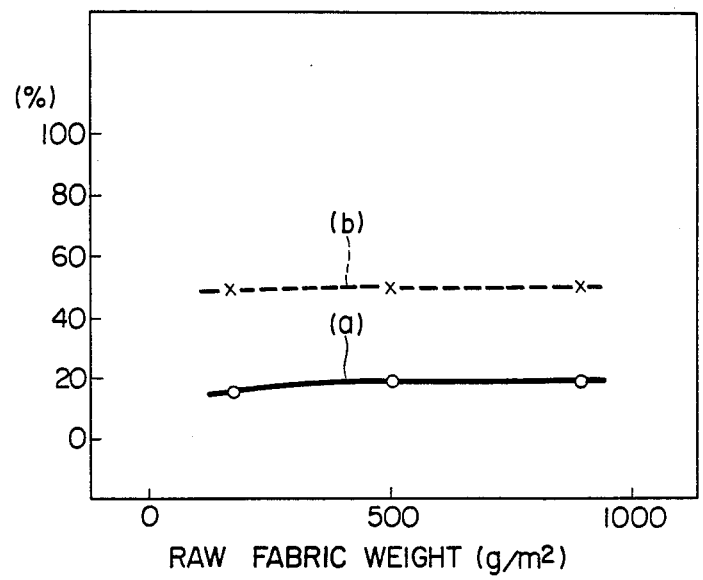
FIG. 14 is a graph showing the relation between the weight ($g/m^2$) of raw fabric and the capacitance ratio of capacitors with the activated carbon fiber electrodes produced by activating the raw fibers.

FIG. 14 shows the relation between the unit-area weight of raw fabrics and the capacitance ratio of capacitors using the activated carbon fabrics resulting from the carbonization and activation of the raw fabrics and the ordinate represents the weight loss value and the area loss value corresponding to the capacitance ratio peak of 100% in FIG. 13. This tendency remains the same even if the unit-area weight of the raw fabrics is varied over a wide range.

Figure 15:
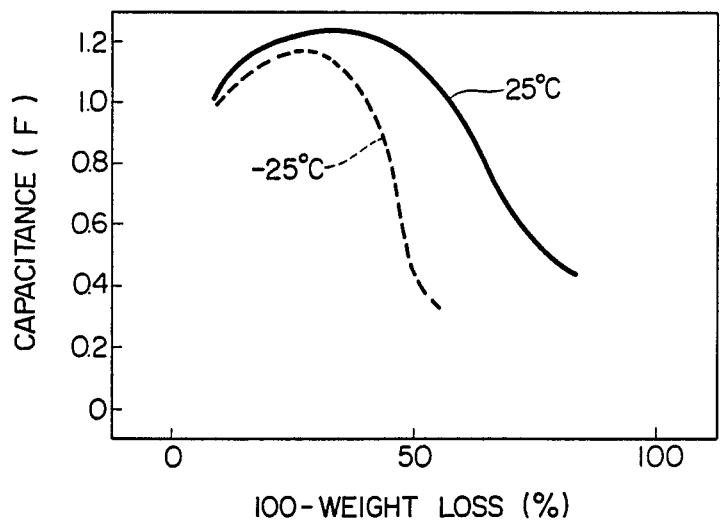
FIG. 15 is a graph showing comparatively the relation between the weight loss due to the activation process and the capacitance of capacitors using the resulting electrodes in consideration of temperature factors.

FIG. 15 shows the relation between the weight loss of the fabrics due to the carbonization and activation and the capacitance of electric double layer capacitors using the fabrics for the electrodes at 25° C. and −25° C., respectively.

With these characteristics, the capacitance at 25° C. gradually increases with increase in the weight loss due to the activation and the peak is attained at around 60%. On the other hand, the capacitance at −25° C. rapidly increases in response to the weight loss of about 70% and thereafter the capacitance varies closely following the curve of the capacitance at 25° C. The graph shows the values of the capacitors using two electrodes of 10 mm $\phi$.

Figure 16:
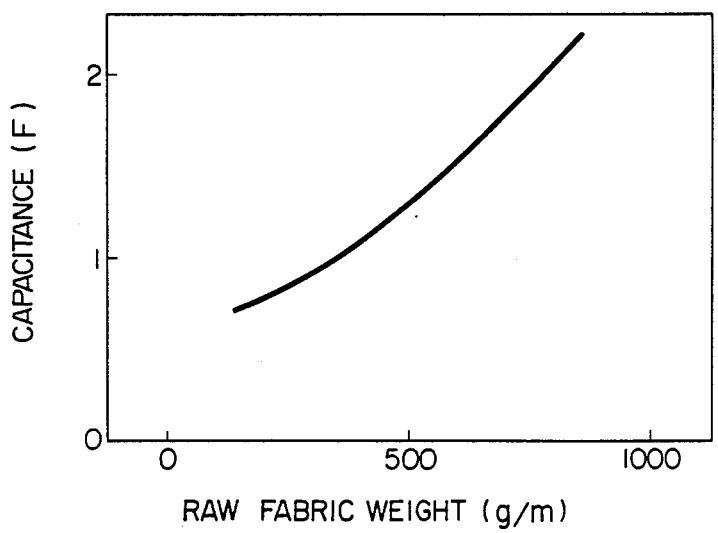
FIG. 16 is a graph showing the relation between the eyelet weight of raw fabric and the capacitance of capacitors with the electrodes made of activated carbon fiber fabric obtained by activating the raw fabric.
Figure 17:
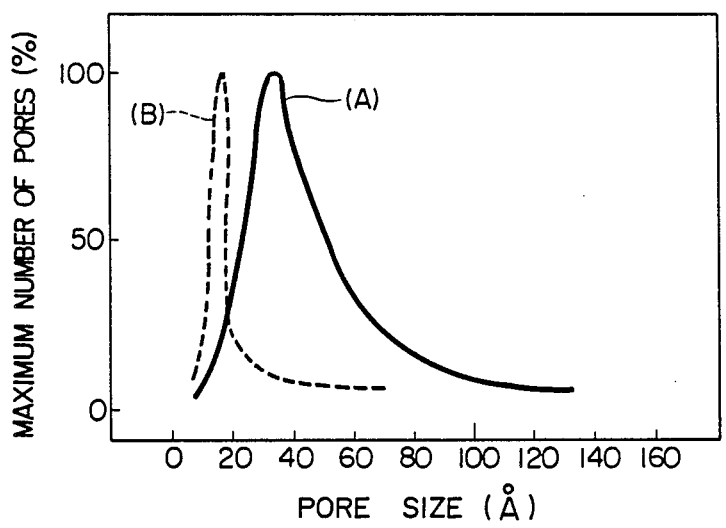
FIG. 17 is a graph showing the pore size distribution of activated carbon fibers.

FIG. 16 is a graph showing the relation between the weight (g/m$^2$) of raw fabrics and the capacitance of capacitors using the resulting activated carbon fabrics for the electrodes. In the Figure, the capacitances of the capacitors having two electrodes of 10 mm $\phi$ are shown as in the case of FIG. 15. The capacitance values of this Figure are those obtained by the discharge tests at 10 mA. From the Figure it will be seen that the capacitance value of 1.3 F is obtained with the two electrodes of 10 mm $\phi$ made of the raw fabric having a unit-area weight of 500 g/m$^2$ and this results in the following equation:

$$500/\{2\times 1.3/(7.85\times 10^{-5})\} = 0.015 \text{ (g/m}^2\text{)/(F/m}^2\text{)}$$

Thus, the optimum fabric unit-area weight for obtaining a capacitance value of 1F/m$^2$ is 0.05 g/m$^2$. In this example, the discharge current is 10 mA and thus considering the discharge at a greater or smaller current than this value the optimum fabric unit-area weight for obtaining a capacitance value of 1F/(m$^2$ of activated carbon fabric) is in the range between 0.002 g/m$^2$ and 0.2 g/m$^2$.

In the case of the woven and nonwoven raw fabrics used with the invention, the suitable range of fabric unit-area weights is from 20 g/m$^2$ to 1000 g/m$^2$. If the unit-area weight of the fabric is less than this range, the fabric is extremely open in weave and the fabric finds it difficult to maintain its shape. On the other hand, if the unit-area weight of the fabric is greater than the range, the finished thickness exceeds 2.0 mm and this is also not preferable from the standpoint of the surface fiber ratio described in the first section.

(3) Activation gas supply and method therefor.

Figure 18:
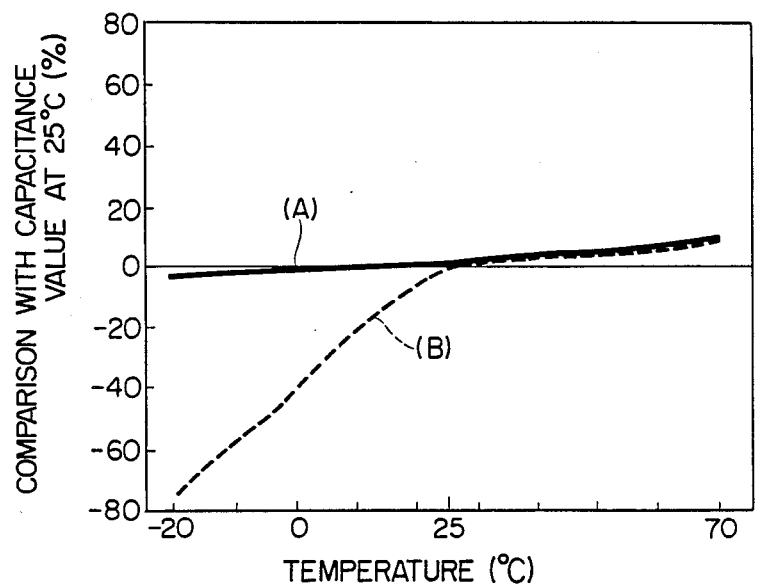
FIG. 18 is a graph showing the capacitance-temperature characteristics of capacitors using the electrodes made of the activated carbon fibers of FIG. 17.

A pore size of 20 Å or more of micropores in the activated carbon fiber is necessary for an electric double layer capacitor to function effectively. (The suitable range of values is disclosed for example in the invention of the inventors in Japanese Patent Application No. 58-13456). While generally the value of the electric double layer capacitance increase with an increase in the specific surface area of the activated carbon, when used for the electrodes of the electric double layer capacitor, even in the case of the activated carbon materials having the same specific surface area of 1500 m$^2$/g, the following differences in characteristics occur between the material in which the greater proportion of the pore distribution includes pore sizes of over 20 Å as shown by the curve A and the material in which the greater proportion of the pore distribution includes pore sizes of less than 20 Å as shown by the curve B in the pore distribution diagram of FIG. 17. In other words, in FIG. 18 showing the capacitance-temperature characteristics of the capacitors using the activated carbon materials of FIG. 17, the activated carbon of (A) exhibits sufficiently high capacitance values both at room temperature and at low temperatures, while, the activated carbon of (B) exhibits substantially the same capacitance values as (A) at room temperature but considerably low capacitance values at low temperatures. This difference in temperature characteristic is caused by the relation between the pore size and the thickness (2 to 3 Å) of the electric double layers.

In view of these circumstances, the suitable activated carbon for the polarizable electrodes of the electric double layer capacitor must meet the essential requirement of having a high specific surface area and including uniformly a large number of pores of the size over 20 Å. In the case of the powdered activated carbon used for the polarizable electrodes of the electric double layer capacitors of the previously mentioned first and second types, this essential requirement can be met relatively easily by means of stirring or the like during manufacture. However, where such activated carbon fabric as used with the invention is used for the polarizable electrodes, it is quite difficult to obtain a fabric uniformly having pores of a large pore size.

Figure 19A:
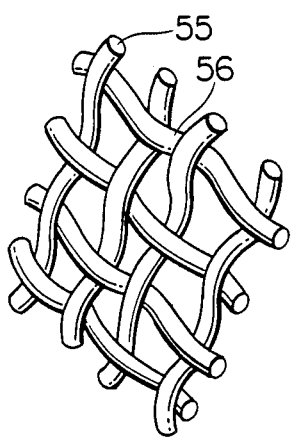
FIGS 19a to 19c diagrams for comparatively explaining the progress of activation of fabrics with respect to the outer and inner part of the fabrics.
Figures 19B, 19C:
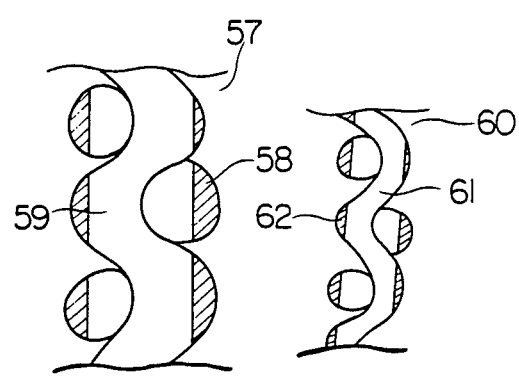

FIGS. 19a to 19c are enlarged views for explaining a pre-activation raw fabric and the progress of activation of the fiber. FIG. 19a shows the raw fabric which is not subjected to the carbonization and activation processes as yet and it is composed of warp threads 55 and woof threads 56 which are made by twisting together fine primary fibers. Generally, the fabric has a thickness of 0.5 to 2 mm. The activation of this fabric with water vapor gives rise to the following problems. The carbonization and activation by the water vapor is given as $$C_n + H_2O \rightarrow C_{n-1} + CO \uparrow + H_2 \uparrow \qquad (2)$$

As will be seen from the equation (2), the carbonization and activation process is a reaction in which carbon is attacked by the oxygen atoms of H$_2$O molecules and the chance for contact between the H$_2$O molecules and the carbon fibers serves as a rate-determining factor for the rate of the reaction. As a result, if the amount of water vapor is not sufficient, only fibers 58 present at the surface of a fabric 57 are activated and fibers 59 existing within the fabric 57 are not fully activated as shown by the sectional view of the fabric in FIG. 19b. On the other hand, if the activation time is increased but the same amount of water vapor is used, as shown in FIG. 19c, fibers 61 inside a fabric 60 are activated optimally but fibers 62 in the vicinity of the surface are activated excessively.

Figure 1:
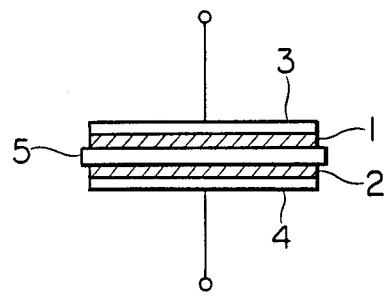
FIG. 1 is a sectional view showing the basic construction of electric double layer capacitors.
Figure 2:
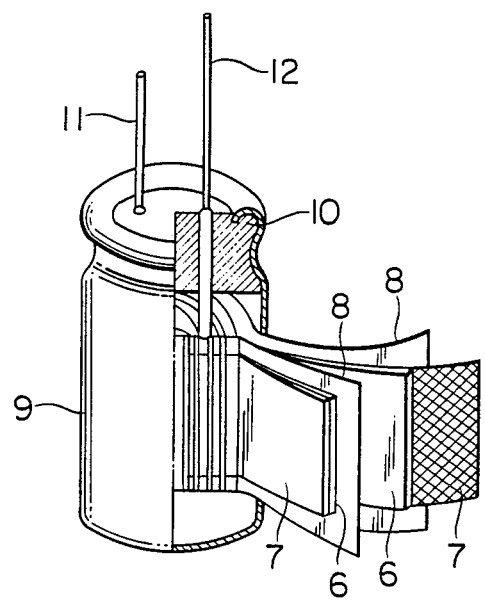
FIGS. 2, 3, 4 show by way of examples the conventional constructions of electric double layer capacitors.
Figure 3:
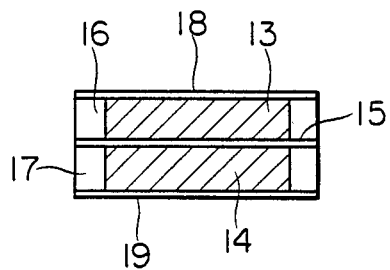
Figure 4:
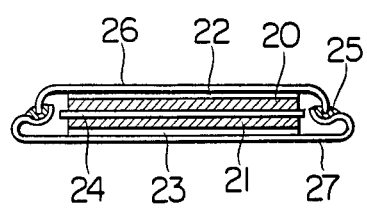

The following Table 1 shows the characteristics of the electric double layer capacitors constructed by stamping two electrodes of 10 mm $\phi$ from activated carbon fabrics corresponding to FIGS. 19b and 19c, respectively, and assembling the electrodes, along with separators and electrolyte, into the same form as shown in FIG. 4.

TABLE 1

| Activated carbon fabric strength | Characteristics of electric double layer capacitor | | |
|---|---|---|---|
| | Capacitance (25° C.) | Capacitance (−25° C.) | Resistance |
| FIG. 19b Strong | 0.8 F | 0.1 F | 5 Ω |
| FIG. 19c Weak | 0.5 F | 0.48 F | 10 Ω |

Figures 20A, 20B, 20C:
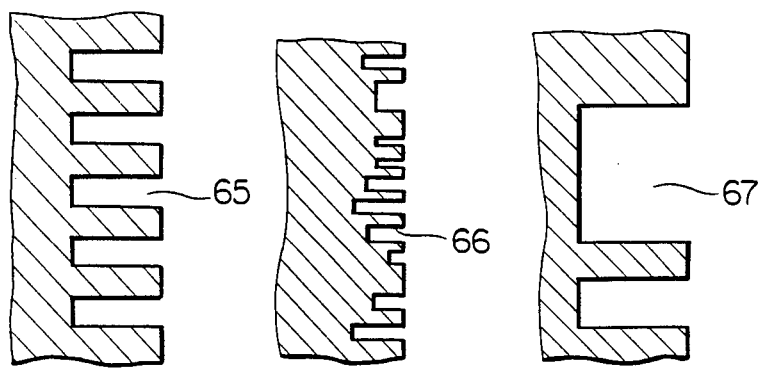
FIGS. 20a to 20c are diagrams for explaining the relation between the degree of progress of activation and the shape of pores formed on activated carbon fibers.

FIGS. 20a to 20c show the manner in which the shape of the pores of the activated carbon undergo changes in response to the progress of activation.

While, in the case of FIG. 19b, the greater portion of the pores formed in the fibers at the fabric surface comprise pores 65 of sizes greater than 20 Å as shown in FIG. 20a, the fibers inside the fabric are not activated fully thus forming only pores 66 as shown in FIG. 20b. Thus, as shown in Table 1, there is the disadvantage of the reduced capacitance at low temperatures although the capacitance at room temperature has a relatively large value. Also, in the case of FIG. 19c, while the fibers inside the fabric include excellent pores as shown in FIG. 20a, there is the disadvantage that the fibers at the fabric surface are activated excessively so that the diameter of pores 67 becomes excessively large as shown in FIG. 20c and the total area is reduced. There is another disadvantage of greatly decreasing the strength.

As regards the degree or frequency of contact between the activation gas and the fibers to be activated, the previously mentioned "surface fiber ratio" or the weaving method and the weight (g/m$^2$) of the fabric constitute an important governing factor. In addition to these factors, the amount of activation gas and the gas pressure mentioned in this section constitute another important factors.

In accordance with the invention the polarizable electrodes of an electric double layer capacitor are made of an activated carbon fabric prepared by carbonizing and activating a raw fabric with water vapor of 20 mm Hg or over in a high-temperature inert gas atmosphere. During the activation of the raw fabric with water vapor, the water vapor having a high vapor pressure is supplied so that the absolute water content in the atmosphere is increased and thus the water vapor is introduced in a sufficient amount inside the fabric. Thus, any difference of the degree of progress of the activation reaction in the thickness direction of the fabrics is eliminated and uniform pores are formed throughout the fabric in a short period of time. The method of supplying the activation gas will be described in detail in connection with the description of examples later.

Another embodiment of the invention incorporating a method of further improving the efficiency of contact between an activation gas and a fabric during ther activation will now be described.

This method features impregnation of a raw fabric with water prior to its activation. This step has great advantages: (1) During activation the impregnated water vaporizes and acts as an activation gas. (2) Since the fibers are preliminarily impregnated with water, the wetting properties of the fibers to the water vapor are improved and the contact oxidation reaction with the activation gas is effected smoothly.

Figure 21:
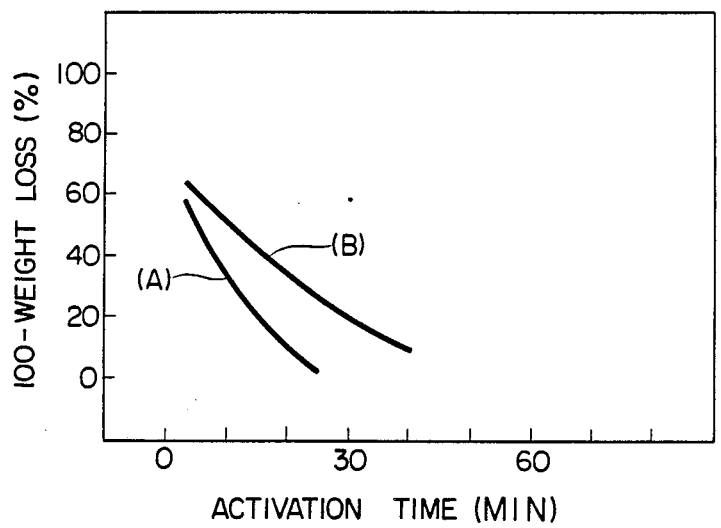
FIG. 21 is a graph showing the relation between the activation time and the weight loss caused by activation.

FIG. 21 is a characteristic diagram for explaining the effect of the invention and it shows the relation between the activation time and weight loss of a novolac fabric having a size of 10 cm×10 cm, thickness of 1 mm and eyelet weight of 200 g/m$^2$. The activation temperature is 800° C. and the activation gas is propane combustion gas. In the Figure, the curve A shows the data obtained by activating a fabric preliminarily impregnated with water as the present invention and the curve B shows the data of one activated by the conventional method. As will be seen from the Figure, the weight loss of about 90% takes place in 20 minutes in the case of the curve A and the curve B shows the similar weight loss as the curve A in 40 minutes which is about two times. This means that in accordance with the invention the activation progresses at a rate which is about two times the conventional rate.

Figure 22:
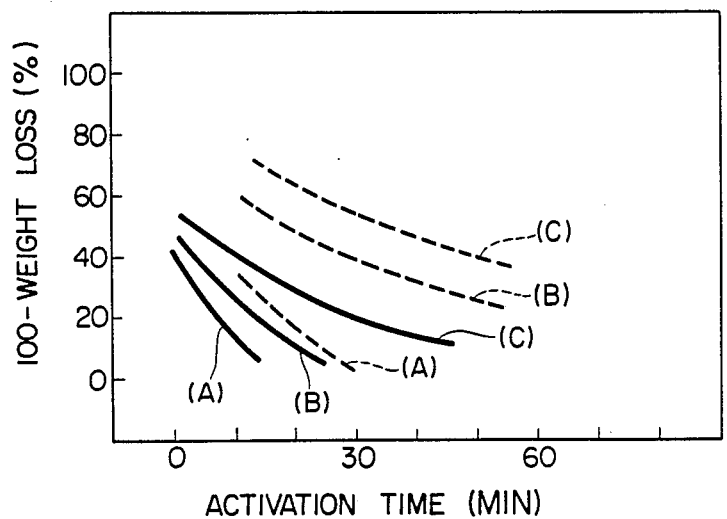
FIG. 22 is a graph showing the effect of a water impregnated activation process.

Referring to FIG. 22, the solid lines show the relation between the activation time and the weight loss in the cases using the activation method of this invention and the broken lines show the relation in the cases using raw fabrics which were not impregnated with water.

The curves A, B and C respectively correspond to the fabrics having unit-area weights (g/m$^2$) of 100 g/m$^2$, 300 g/m$^2$ and 500 g/m$^2$ respectively and it will be seen that the rate of weight loss by the activation varies from 1.5 to 3 times for the same unit-area weights depending on whether the fabrics were impregnated with water and this effect increases with an increase in the unit-area weight. It is to be noted that the effect of the water impregnation increases in proportion to the impregnation time, although the effect differs depending on the unit-area weight of the raw fabric. Also, by adding for example alkali metal or alkaline earth metal ions to the impregnating water, it is possible to control the size of the pores formed during the activation by virtue of the catalytic action of these ions.

(4) Reduction of capacitor internal resistance.

Figure 23:
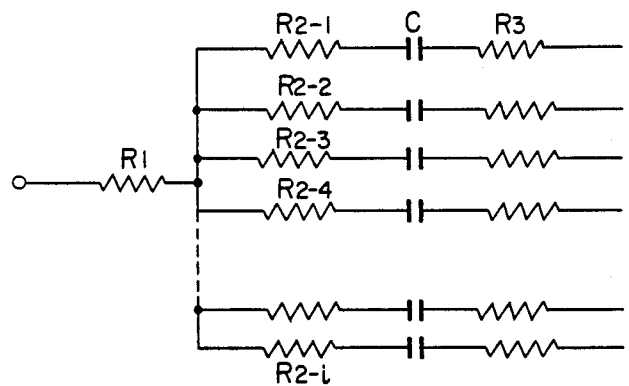
FIG. 23 is an equivalent circuit diagram of the capacitor.

FIG. 23 shows an equivalent circuit of an electric double layer capacitor and considering each of the component parts as a small capacitor the internal resistance is conceivable as including a resistance $R_1$ due to the resistance of the conductive electrodes themselves and the contact resistance between the conductive electrodes and the polarizable electrodes, the internal resistance of a polarizable electrode $R_2$, an electric double layer capacitance C and the resistance of an electrolyte $R_3$. In other words, $R_1$ is the resistance due to the aluminum electrodes themselves and the contact between the aluminum electrodes and the activated carbon layers and $R_2$ is the resistance of the activated carbon layers themselves having an effect when taking the capacitance from the respective capacitor elements to the aluminum electrodes.

Figure 24A:
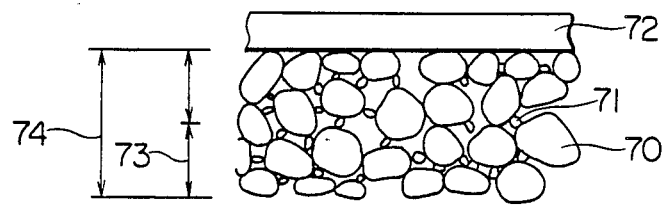
FIGS. 24a and 24b are diagrams for explaining the capacitance lead-out efficiency of capacitors with electrodes made of a powdered activated carbon and an activated carbon fiber.
Figure 24B:
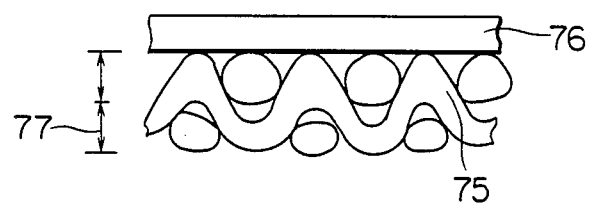

In the case of a capacitor having polarizable electrodes made of the previously mentioned activated charcoal powder, the activated carbon layers contain acetylene black so that the resistances of the activated carbon layers are low enough and therefore the resistance $R_2$ is very small. On the contrary, with a capacitor of the type using polarizable electrodes made of activated carbon fibers, the resistance $R_2$ is increased as will be mentioned below so that if nothing is done, the internal resistance increases and the capacitor is not suited for high rate discharge. In other words, while the carbonized non-activated fiber is low in electric resistance, its specific surface are is small and it is not suitable for the polarizable electrode. On the other hand, while the activated carbon fibers subjected to activation have a very great specific surface area of 1000 to 2500 m$^2$/g and are suitable for the polarizable electrodes, the electric resistance of the fibers themselves is also increased thus increasing the resistance $R_2$. FIGS. 24a and 24b are schematic diagrams of these capacitors. In FIG. 24a showing the capacitor using the powdered activated carbon electrodes, conductives acetylene black 71 are present between individual activated carbon particles 70 and the capacitance of a portion 73 remote from an aluminum electrode 72 is satisfactorily taken out due to the electric conductivity of an activated carbon layer 74. On the contrary, with the other type of FIG. 24b using the activated carbon fibers, the electric conductivity of activated carbon fibers 75 themselves is low so that the capacitance of a portion 77 remote from an aluminum electrode 76 is not easily taken out and consequently the apparent capacitance is decreased. To overcome these deficiencies, as for example, a method (Japanese Patent Application No. 57-177938) is conceivable in which carbon particles are carried on the surface of activated carbon fibers and this method has limitations from the aspects of characteristics and manufacturing method and it leaves room for improvement.

Thus, with a view to reducing the internal resistance of an electric double layer capacitor using polarizable electrodes made of activated carbon fibers, the present invention features the use of the following woven fabrics and nonwoven fabrics for the electrodes. In other words, the present invention comprises an electric double layer capacitor in which structural members such as woven or nonwoven fabrics made of activated carbon fibers and conductive wires are used as polarizable electrodes.

Figure 25A:
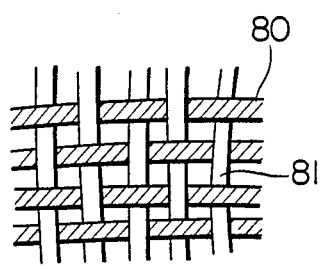
FIGS. 25a to 25e are diagrams showing some examples of a woven fabric used with the invention.
Figure 25B:
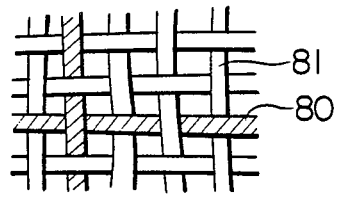
Figure 25C:
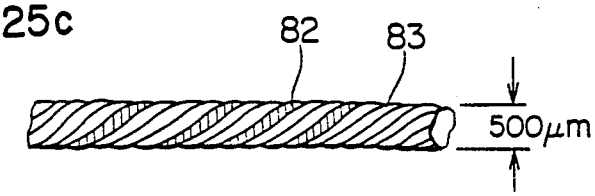
Figure 25D:
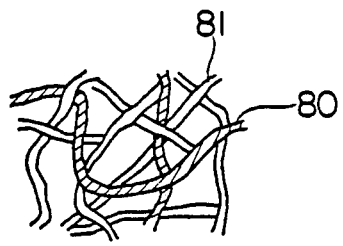
Figure 25E:
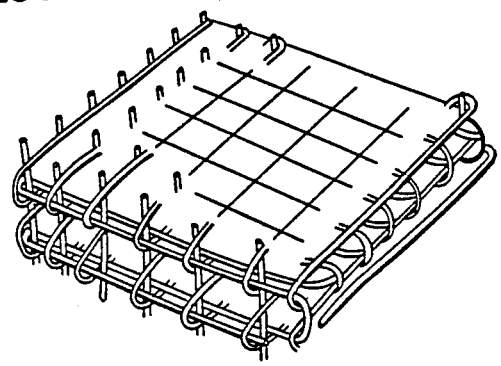

FIGS. 25a to 25e schematically show in enlarged form some examples of the polarizable electrode according to the invention. The examples are each composed of conductive wires 80 and activated carbon fibers 81. FIG. 25a shows the plain weave electrode using activated carbon fibers as warp threads and tantalum wires as woof threads. FIG. 25b shows the similar plain weave electrode in which practically almost all the warp and woof threads are activated carbon fibers and tantalum wires are used only partly. This construction also accomplishes the object of the invention. FIG. 25c shows the plain weave electrode in which the warp and woof threads are secondary fibers made by twisting together primary fibers 82 of 2 μm diameter and tantalum wires 83 of 2 μm diameter in suitable proportions. FIG. 25d shows the electrode in which tantalum wires and activated carbon fibers are combined into a felt like form and this nonwoven form also meet the purpose of the invention. FIG. 25e shows the three-dimensional weave electrode made of tantalum wires and activated carbon fibers and this three-dimensional weave has the effect of ensuring positive electric contact between the conductive wires and the activated carbon fibers and improving the effect of the invention further.

The following two methods are conceivable for the manufacture of these polarizable electrodes. In other words, the one is to preliminarily blend and weave conductive wires and nonactivated fibers and activate the resulting fabric and the other is to weave conductive wires into an activated fabric. While there are many suitable materials for use as the conductive wires, with the former method metals having melting points higher than the activation temperature, e.g., tantalum, titanium and nichrome are suitable and aluminum, carbon fibers and the like are suitable materials in the case of the latter method.

Figure 26:
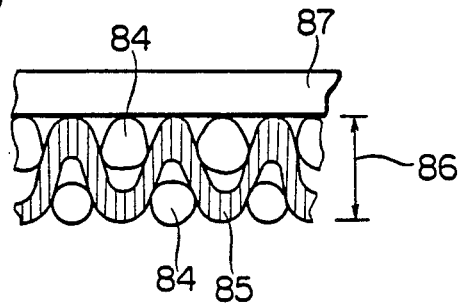
FIG. 26 is a diagram for explaining the capacitance lead-out efficiency improving effect of the invention.

FIG. 26 shows schematically the effective function of the invention. More specifically, low resistance conductive wires 85 are woven into relatively high-resistance activated carbon fibers 84 so that the current collection of the whole activated carbon fiber layer 86 is improved and hence the delivery of the capacitance to a conductive layer 87 is improved. Thus, as will be described in connection with the description of examples, the internal resistance of the capacitor is decreased and the capacitance value per volume is increased.

EXAMPLE 1

Novolak fibers of 0.4 μm diameter and 100 mm long are bundled into secondary fibers of 100 μm and warp and woof threads each including two of the secondary fibers are woven into a plain fabric having a surface fiber ratio of 0.5. The fabric is held in an atmosphere of 800° C. and activated with an activation gas such as water vapor or $CO_2$ for 30 minutes. Then, an aluminum electrode is formed on one side of the fabric by plasma spray process and then disks of 5 mm $\phi$ diameter are stamped from the fabric. Inserted between the two electrodes thus prepared is a separator. Two electrodes and a separator are impregnated with an electrolyte composed of propylene carbonate, γ-butyrolactone and tetraethyl ammonium perchlorate and these elements are enclosed by a metal case through a gasket thereby assembling a flat-type capacitor.

Table 2 shows the characteristics of the electric double layer capacitor provided in accordance with the invention. The table also shows the characteristics of two conventional electric double layer capacitors respectively assembled in the same manner by using a plain weave fabric having a surface fiber ratio of 0.05 and made of the same secondary fibers as the invention and a plain weave fabric (surface fiber ratio =0.1) made by using warp and woof threads each including two continuous filaments of 100 μm diameter. The fibers of the conventional capacitors were activated under the same conditions as the invention.

TABLE 2

|  | Fabric used | | | | Electric double layer capacitor characteristics | |
|---|---|---|---|---|---|---|
|  | Diameter of primary fiber | Diameter of secondary fiber | Weave | Surface fiber ratio | Capacitance | Resistance |
| Invention | 0.4 μm | 100 μm | Plain weave | 0.5 | 0.2 F | 5 Ω |
| Conventional example | 0.4 μm | 100 μm | Plain weave | 0.003 | 0.1 F | 20 Ω |
|  | 100 μm | — | Plain weave | 0.005 | 0.08 F | 15 Ω |

EXAMPLE 2

A Kynol raw fabric having the weight of 200 g/m² is carbonized by holding it in a combustion waste gas atmosphere of 700° C. for 30 minutes. The resulting carbon fiber fabric is impregnated with a 1% solution of NaOH in water, dried at the room temperature for 1 hour, activated for 2 hours in a combustion waste gas furnace of 800° C. and then washed in water and dried. The thus prepared activated carbon fabric has the weight of 100 g/m² and the weight loss is about 60%. After a conductive carbon paint has been applied to the surface of the activated carbon fabric and dried, disks of 10 mm diameter are stamped from the activated carbon fabric. The two activated carbon fabric disks are impregnated with an electrolyte comprising a mixture of propylene carbonate and 10 wt % of tetraethyl ammonium perchlorate and then assembled, along with a polypropylene separator (12 mm in diameter and 100 μm in thickness) and a metal case, into a button-type electric double layer capacitor as shown in FIG. 4.

Table 3 shows the characteristics of the electric double layer capacitor obtained according to this example and also shown for comparison purposes are the characteristics of a capacitor using an activated carbon fabric whose weight loss or decrease on activation is 10% and a capacitor using an activated carbon fabric with the weight loss or decrease of 95%.

TABLE 3

| | Activated carbon fabric strength | Electric double layer capacitor characteristics | | |
|---|---|---|---|---|
| | | Capacitance (at 25° C.) | Capacitance (at −20° C.) | Resistance |
| Invention | Strong | 0.8 F | 0.8 F | 3 Ω |
| Conventional example | Activation weight loss 10% Strong | 0.3 F | 0.1 F | 3 Ω |
| | Activation weight loss 95% Fragile | 0.7 F | 0.7 F | 5 Ω |

The activated carbon fabric used with the invention can be used with electrolytes of aqueous solution type and a case where sulfuric acid is used as the electrolyte will now be described by way of example.

EXAMPLE 3

A Kynol raw fabric having the weight of 200 g/m² is carbonized by holding it in a combustion waste gas atmosphere of 700° C. for 30 minutes. The resulting carbon fabric is impregnated with a 1% aqueous solution of NaOH, dried for 1 hour at the room temperature, activated for 2 hours in a combustion waste gas furnace at 800° C. and washed in water and dried. The thus prepared activated carbon fabric has the weight of 100 g/m² and the weight loss is about 60%.

The surface of the activated carbon fabric is coated with a conductive carbon paint and dried after which the activated carbon fabric is stamped into disks of 10 mm diameter. The two activated carbon fabric disks are impregnated with an electrolyte composed of an aqueous solution of sulfuric acid and then assembled, along with a polypropylene separator (12 mm in diameter and 100 μm in thickness) and a corrosion-resisting metal case, into a button-type electric double layer capacitor as shown in FIG. 4.

Table 4 shows the characteristics of the electric double layer capacitor obtained in accordance with this example and also shown for the comparison are the characteristics of a capacitor using an activated carbon fabric whose weight loss due to activation is 10% and a capacitor using an activated carbon fabric with the weight loss of 95%.

TABLE 4

| | Activated carbon fabric strength | Electric double layer capacitor characteristics | | |
|---|---|---|---|---|
| | | Capacitance (at 25° C.) | Capacitance (at −20° C.) | Resistance |
| Invention | Strong | 5 F | 5 F | 0.1 Ω |
| Conventional example | Activation weight loss 10% Strong | 3 F | 0.2 F | 0.1 Ω |
| | Activation weight loss 95% Fragile | 4 F | 4 F | 0.1 Ω |

EXAMPLE 4

Figure 27:
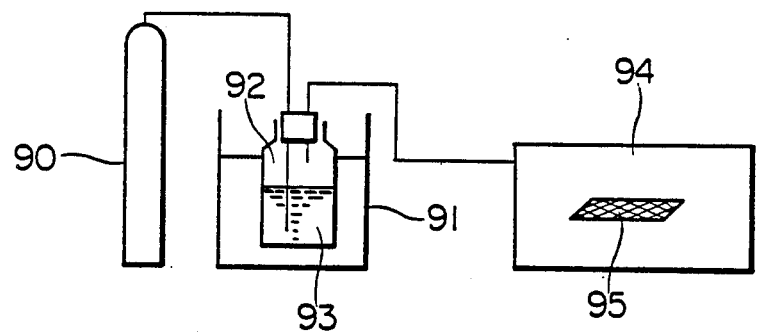
FIGS. 27 and 28 are diagrams showing the principles of activation gas supply apparatus according to the invention.

FIG. 27 shows an example of a water vapor supply method used with the present invention. In order to supply water vapor, the gas supplied from an inert gas bomb 90, e.g., nitrogen or argon is passed and bubbled through a bottle 92 in a holding tank 91 so that the gas is contacted with water 93 in the bottle 92 and bubbles are formed. If the temperature of the holding tank 91 is held at 50° C., the inert gas having a partial water vapor pressure of about 92 mm Hg is supplied into a furnace proper 94. A Kynol raw fabric 95 having the 200 g/m² is held at 800° C. for 10 minutes thereweight by completing the activation in the furnace 94.

EXAMPLE 5

Figure 28:
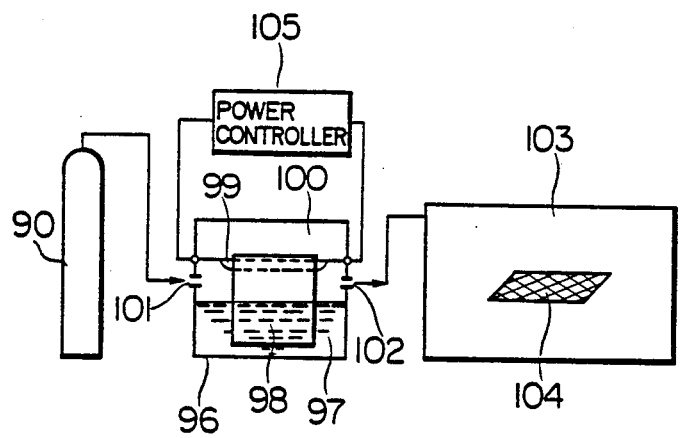

FIG. 28 shows another example of the water vapor supply method used with the invention. The supply of water vapor is accomplished by means of a liquid vaporizing apparatus 100 basically comprising water 97 contained in a closed vessel 96, a porous absorber 98 composed of a glassfiber fabric or the like and disposed to partly contact with the water 97 and a heater 99 in partial contact with the porous absorber 98. The gas from an inert gas bomb 90, e.g., argon or nitrogen is introduced into the liquid vaporizing apparatus 100 through an inlet 101 so that the water vapor is produced by the vaporizing action of the porous absorber 98 and the heater 99 and, using the inert gas as a carrier, the water vapor is supplied through an outlet 102 into a furnace proper 103 containing a Kynol raw fabric having the weight of 200 g/m². Numeral 105 designates an electric power controller for the heater 99 and this power control makes it possible to accurately control as desired the vapor supply per unit time. In this example, the fabric is activated at 800° C. for 10 minutes with the inert gas flow of 5 l/min and the heater power of 0.1 kW.

Both of the two different vapor supply methods are capable of supplying a large amount of water vapor and thereby accomplishing the optimum activation in a short period of time. While the effect of the invention is enhanced with an increase in the vapor pressure, the value of the optimum vapor pressure differs depending on the amount of input Kynol fabric, activation temperature and time and so on.

Figure 29:
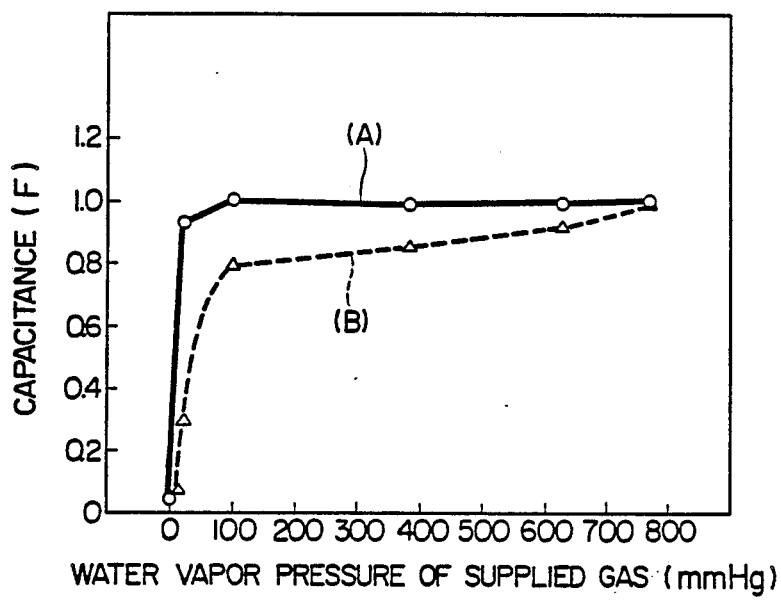
FIG. 29 is a graph showing the relation between the pressure of supplied vapor gas and the capacitance of capacitors using electrodes made of activated carbon fibers produced by the activation process at these gas pressures.
Figure 30:
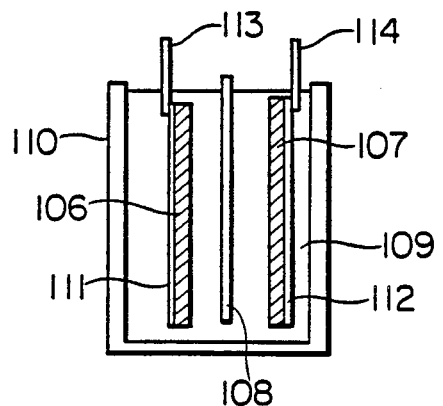
FIG. 30 is a sectional view showing a capacitor according to the embodiment of the invention.

FIG. 29 shows the correlation between the vapor pressures of the supplied vapor and the capacitance characteristics of electric double layer capacitor using activated carbon fabrics made using the different vapor pressures. The electric double layer capacitors are made by the same method as the examples of the invention. In the Figure, the curve A shows the capacitance values at room temperature and the curve B shows the capacitance values at −25° C. It will be seen from the Figure that the supply of vapor higher than 20 mm Hg ensures a satisfactory room temperature capacitance and that vapor pressures lower than this value result in capacitance values close to zero. While increasing the activation time and effecting the activation with a vapor pressure of 20 mm Hg or less has the effect of slightly increasing the capacitance value, this is not practical. Also, the low temperature capacitance varies greatly at around 100 mm Hg. While a vapor pressure of 100 mm Hg or more is necessary from the practical point of view, a vapor pressure in a range of 20 to 100 mm Hg is sufficient if only the room temperature capacitance is required. Also, of the two vapor supply methods shown in the examples 4 and 5, the example 5 can control the amount of vapor production irrespective of the temperature of the atmosphere and it is the effective one more suited to the purpose of the invention.

Table 5 shows the characteristics of electric double layer capacitors produced by using activated carbon fabrics prepared by the methods of the examples 4 and 5. The electric double layer capacitors are made by the following method.

The surface of an activated carbon fabric prepared by the previously mentioned activation is coated by an aluminum layer by a plasma spraying process and the thus formed activated carbon fabric with an Al layer is stamped into disks of 10 mm $\phi$. The two disk electrodes and a polypropylene separator of 100 mm thick are assembled into a coin type cell as shown in FIG. 4. The electrolyte used is a mixture of propylene carbonate and tetraethyl ammonium perchlorate. The table also shows for the comparison the characteristics of a capacitor produced by using a vapor generator effecting the bubbling at 20° C. to supply the water vapor for the activation and the activation time of 30 minutes.

TABLE 5

| | Capacitance (25° C.) | Capacitance (−25° C.) | Internal resistance |
| --- | --- | --- | --- |
| Example 4 | 0.8 F | 0.8 F | 5 Ω |
| Example 5 | 1.0 F | 1.0 F | 5 Ω |
| Conventional example | 0.8 F | 0.1 F | 5 Ω |

EXAMPLE 6

Fabrics Ⓐ and Ⓑ made of novolak phenol fibers and respectively having weights of 100 g/m² and 500 g/m² are immersed in a distilled water for 10 minutes. After taking out from the water and subjecting to air drying for 5 minutes, the fabrics are held in a furnace for 10 minutes at 800° C. During the interval, nitrogen gas containing (a) propane combustion gas or (b) water vapor of 30 mm Hg is introduced into the furnace. After the completion of the activation, a plasma sprayed coating of aluminum is formed on one surface of each of the fabrics and the fabrics are stamped into disks of 10 mm diameter. As shown in FIG. 4, coin-type capacitors are assembled each using two of the fabric disks, a separator, an electrolyte comprising a mixture of propylene carbonate and tetraethyl ammonium perchlorate and a case. Table 6 shows the characteristics of the capacitors according to this example. The table also shows the characteristics of capacitors having activated carbon fibers prepared by the conventional methods which are the same as the present example, except that the step of impregnating the fabric with water prior to the activation is eliminated.

TABLE 6

| | | | | Capacitance at 25° C. | Capacitance at −40° C. | Resistance | Activated carbon fabric strength |
| --- | --- | --- | --- | --- | --- | --- | --- |
| Invention | Ⓐ Weight (g/m²) 100 g/m² | ⓐ | Propane combustion gas activation | 0.4 F | 0.4 F | 3 Ω | Strong |
| | | ⓑ | Water vapor activation | 0.4 F | 0.4 F | 3 Ω | " |
| | Ⓑ Weight (g/m²) 500 g/m² | ⓐ | Propane combustion gas activation | 1.7 F | 1.7 F | 5 Ω | " |
| | | ⓑ | Water vapor activation | 1.7 F | 1.7 F | 5 Ω | " |
| Conventional example | Ⓐ Weight (g/m²) 100 g/m² | ⓐ | Propane combustion gas activation | 0.3 F | 0.05 F | 3 Ω | " |
| | | ⓑ | Water vapor activation | 0.3 F | 0.05 F | 3 Ω | " |
| | Ⓑ Weight (g/m²) 500 g/m² | ⓐ | Propane combustion gas activation | 1.0 F | 0.1 F | 5 Ω | " |
| | | ⓑ | Water vapor activation | 1.0 F | 0.1 F | 5 Ω | " |
| | Weight (g/m²) 500 g/m² 1-hour H₂O activation | | | 1.2 F | 0.6 F | 10 Ω | Weak |
| | Weight (g/m²) 500 g/m² 2-hour H₂O activation | | | 1.5 F | 1.3 F | 10 Ω | Very weak |

EXAMPLE 7

A fabric made of novolak phenol fibers and having the weight of 500 g/m² is immersed in an aqueous solution of 1 wt % calcium nitrate. After taking out from the solution and subjecting to air drying for 10 minutes, the fabric is held in a furnace for 30 minutes at 800° C. During the interval, propane combustion gas is introduced into the furnace. After the completion of the activation, the fabric is washed in water for 10 minutes, dried, coated by a plasma sprayed aluminum layer on one surface thereof and then stamped into disks of 10 mm $\phi$. As shown in FIG. 4, a coin-type capacitor is assembled by using two of the thus prepared fabric electrodes, a separator, an electrolyte comprising an aqueous solution of 10 wt % sulfuric acid and a case. Table 7 shows the characteristics of the capacitor according to this example and the table also shows the characteristics of capacitors using activated carbon fabrics prepared by the conventional method which is the same as the present example except that the step of immersing the fabric in the calcium nitrate aqueous solution prior to the activation is eliminated.

TABLE 7

|  |  | Capacitance at 25° C. | Capacitance at −40° C. | Resistance | Activated carbon fabric strength |
|---|---|---|---|---|---|
| Invention |  | 3 F | 3 F | 0.1 Ω | Strong |
| Conventional example | Activation time 30 min. | 1.2 F | 0.8 F | 0.2 Ω | Strong |
| | Activation time 1 hour | 1.3 F | 0.8 F | 0.2 Ω | Very weak |

EXAMPLE 8

A plain fabric is made by using woof threads comprising secondary fibers of 500 μm diameter made by twisting together Kynol fibers of 4 μm diameter and warp threads comprising tantalum wires of 500 μm diameter. The fabric is then activated by holding it in a propane combustion gas at 850° C. An aluminum layer of 100 μm thick is formed on one surface of the fabric by the plasma spray process and the fabric is stamped into disks of 10 mm diameter. As shown in FIG. 4, a flat-type capacitor is assembled by using two of the disk electrodes, a polypropylene separator (100 μm in thickness) and an electrolyte comprising propylene carbonate and tetraethyl ammonium perchlorate.

EXAMPLE 9

Secondary fibers of 500 μm diameter are made by twisting together Kynol fibers of 4 μm diameter and titanium wires of 10 μm diameter. These fibers are used as warp and woof threads and woven by a twill weave. The resulting fabric is then activated by holding it in a propane combustion gas at 850° C. An aluminum electrode layer of 100 μm thick is formed on one surface of the fabric by the plasma spraying process and then a capacitor is assembled in the same manner as the example 8.

EXAMPLE 10

The same stranded wires of 500 μm diameter as used in the example 9 and titanium wires of 500 μm diameter are woven in a three-dimensional manner as shown in FIG. 25e and a fabric is formed. The fabric is activated in a propane combustion gas at 850° C. and a titanium electrode layer of 100 μm thick is formed on one surface of the fabric by the plasma, spraying process. A capacitor is assembled in the same manner as the example 8.

EXAMPLE 11

A fabric made of Kynol continuous filaments of 500 μm diameter is activated in a propane combustion gas at 850° C. Aluminum wires of 300 μm diameter are woven into the activated carbon fabric and a plasma sprayed layer of aluminum is formed on one surface of the fabric. A capacitor is assembled by using two disk electrodes of 10 mm diameter stamped from the fabric, a separator and an electrolyte.

Another example of the invention employing an aqueous solution of sulfuric acid as an electrolyte will now be described.

EXAMPLE 12

Titanium wires of 10 μm diameter and Kynol fibers of 4 μm diameter are blended and continuous filaments of 500 μm diameter are made. These continuous filaments are used as warp and woof threads and woven into a plain fabric. After activating the fabric in a propane combustion gas at 850° C., a titanium layer is formed on one surface of the fabric by the plasma spraying process. The fabric is then cut into strips of 3 cm×10 cm and an electric double layer capacitor is made by assembling two strip electrodes 106 and 107, a polypropylene separator 108 and a sulfuric acid aqueous solution 109 of 0.1 mol/l into a case 110. Numerals 111 and 112 designate sprayed titanium layers from which leads 113 and 114 are respectively brought out.

Table 8 shows the characteristics of the electric double layer capacitors according to the foregoing five examples. The table also shows the characteristics of electric double layer capacitors of the conventional constructions corresponding to these examples.

Although not described in connection with the examples, the satin and basket weavings of fabrics are also effective. Further, carbon paste layers may be used in place of the sprayed layers as the conductive electrodes.

TABLE 8

|  |  | Capacitance, 10 mA discharge | Internal resistance | Leakage current |
|---|---|---|---|---|
| Invention | Example 8 | 1.5 F | 0.8 Ω | 50 μA |
|  | Example 9 | 1.5 F | 0.8 Ω | 50 μA |
|  | Example 10 | 1.5 F | 0.8 Ω | 50 μA |
|  | Example 11 | 1.5 F | 0.8 Ω | 50 μA |
|  | Example 12 | 50 F | 0.01 Ω | 50 μA |
| Conventional example | Coin type of 10 mm diameter corre. to examples 8–11 | 1 F | 5 Ω | 50 μA |
|  | Corre. to example 12, electrodes of 3 × 10 cm & H₂SO₄ electrolyte | 35 F | 0.1 Ω | 100 μA |

We claim:

1. In an electric double layer capacitor including a pair of polarizable electrodes, the improvement wherein each of said polarizble electrodes includes an activated carbon element comprising a material having activated carbon fibers dispersed therethrough, said electrode having a surface fiber ratio of at least 0.01, wherein said surface fiber ratio is defined as the ratio of the total geometric surface area of said material to the total geometric surface area of said activated carbon fibers.

2. A capacitor according to claim 1, wherein said material is selected from the group consisting of a woven fabric, nonwoven fabric and felt, and wherein conductive wires are dispersed therethrough in addition to said activated carbon fibers.

3. A method of making a polarizable electrode for an electric double layer capacitor having a pair of polarizable electrodes, said method including the step of carbonizing and activating a material comprising one of a woven fabric, nonwoven fabric and felt, which are composed of secondary fibers, said material having a surface fiber ratio of at least 0.01, wherein said surface fiber ratio is defined as the ratio of the total geometric surface area of said material to the total geometric surface area of said secondary fibers.

4. A method according to claim 3, wherein said secondary fibers are composed of twisted primary fibers, the diameter of said primary fibers being less than 20 μm.

5. A capacitor according to claim 4, wherein said material comprises a woven fabric made by weaving one of said activated carbon fibers alone and a combination of activated carbon fibers and conductive wires by a type of weaving selected from the group consisting of a plain weave, basket weave, satin weave, twill weave, three-dimensional weave and any combination thereof.

6. A capacitor according to claim 4, wherein said activated carbon fibers are made of a material selected from the group consisting of phenol, rayon, pitch and PAN type fibers.

7. A method according to claim 3, wherein said one of a woven fabric, non woven fabric and felt has a weight (g/m$^2$) from 20 g/m$^2$ to 1000 g/m$^2$.

8. A method according to claim 3, wherein said fiber is made of a material selected from the group consisting of phenol, rayon, pitch and PAN type fibers.

9. A method according to claim 3, wherein said one of woven fabric, nonwoven fabric and felt has a weight (g/m$^2$) of from 0.002 A (g/m$^2$) to 0.2 A (g/m$^2$), where the desired capacitance is represented by A farads/m$^2$ of activated carbon element.

10. A method according to claim 3, wherein said one of woven fabric, nonwoven fabric and felt comprises an element made of a combination of conductive wires and one of phenol, rayon, pitch and PAN type fibers.

11. A method according to claim 10, wherein said conductive wires are made of a material having a melting point higher than the carbonization and activation temperatures of said element.

12. A method according to claim 10, wherein said conductive wires are made of a material selected from the group consisting of tantalum, titanium, nichrome and an alloy thereof.

13. A method according to claim 3, wherein said carbonization and activation process is effected in an atmosphere including at least nitrogen and water vapor.

14. A method according to claim 3, wherein said element comprising one of a woven fabric, nonwoven fabric, felt is impregnated with water prior to activation.

15. A method according to claim 14, wherein said water contains ions of at least one of alkaline metal and alkaline earth metal.

* * * * *